Aug. 6, 1940.      H. S. BURLING      2,210,526
TEMPERATURE CONTROLLING MEANS
Filed April 20, 1937      2 Sheets-Sheet 1

INVENTOR.
Herbert S. Burling
BY Morgan, Finnegan and Durham
ATTORNEYS

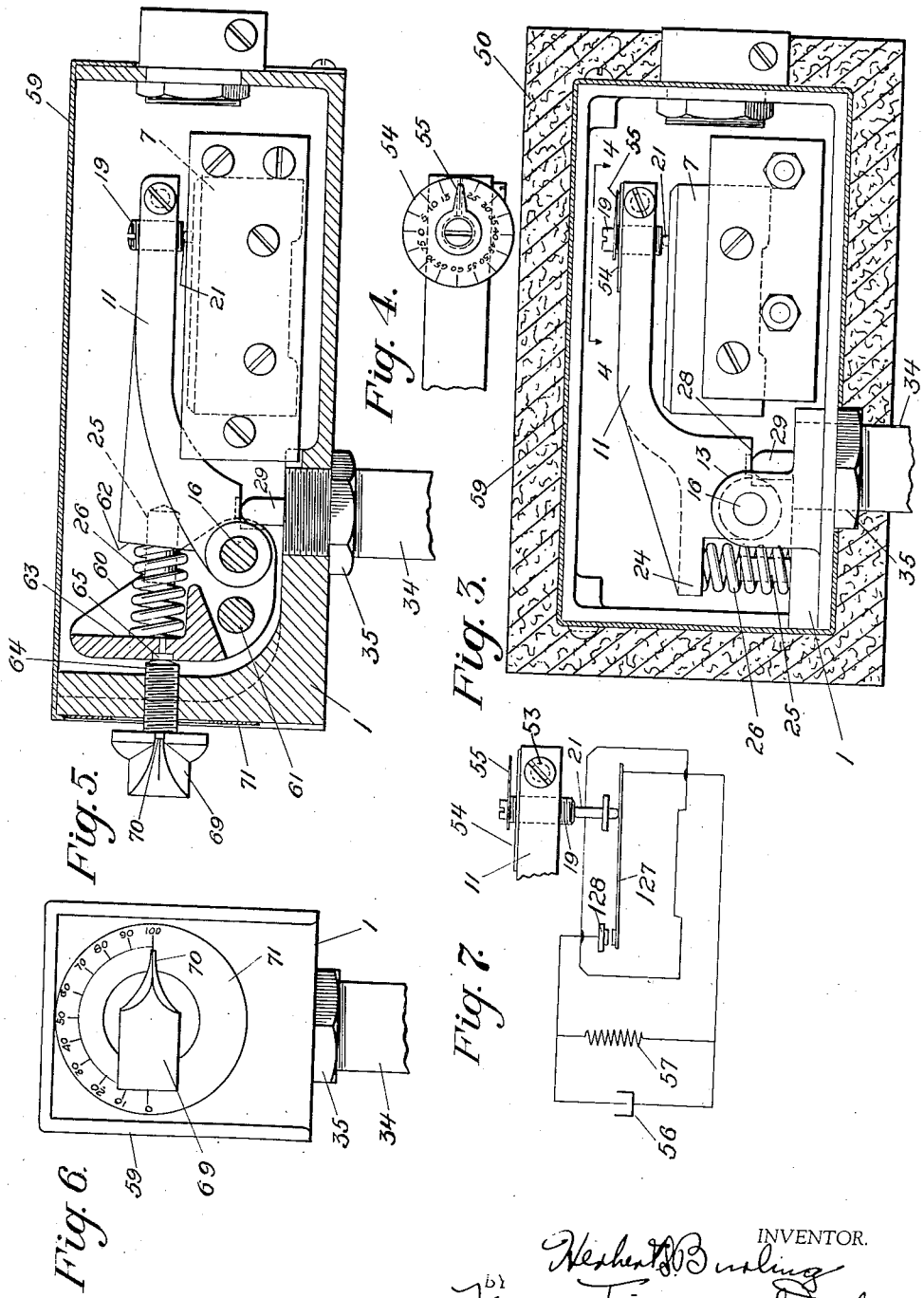

Patented Aug. 6, 1940

2,210,526

UNITED STATES PATENT OFFICE 2,210,526

TEMPERATURE CONTROLLING MEANS

Herbert S. Burling, South Orange, N. J.

Application April 20, 1937, Serial No. 137,908

1 Claim. (Cl. 200—137)

The invention relates to novel and useful improvements in temperature-controlling mechanisms, and more especially to such improvements in differential expansion controlling mechanisms adapted to control the temperatures in chambers requiring exact temperature regulation, as for example high temperature furnaces, melting pots, incubators, and other uses as well.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Fig. 3 is a detail, partly in elevation and partly in section, of a switch mechanism and control therefor used in one embodiment of my invention;

Fig. 4 is a fragmentary plan on the line 4—4 of Fig. 3;

Fig. 5 is a view, partly in section and partly in elevation, of a switch mechanism and control therefor employed in one embodiment of my invention;

Fig. 6 is a view looking at Fig. 5 from the left; and

Fig. 7 is a fragmentary view of the switch shown in Fig. 3 with diagram of a control circuit.

Figures 1, 2:
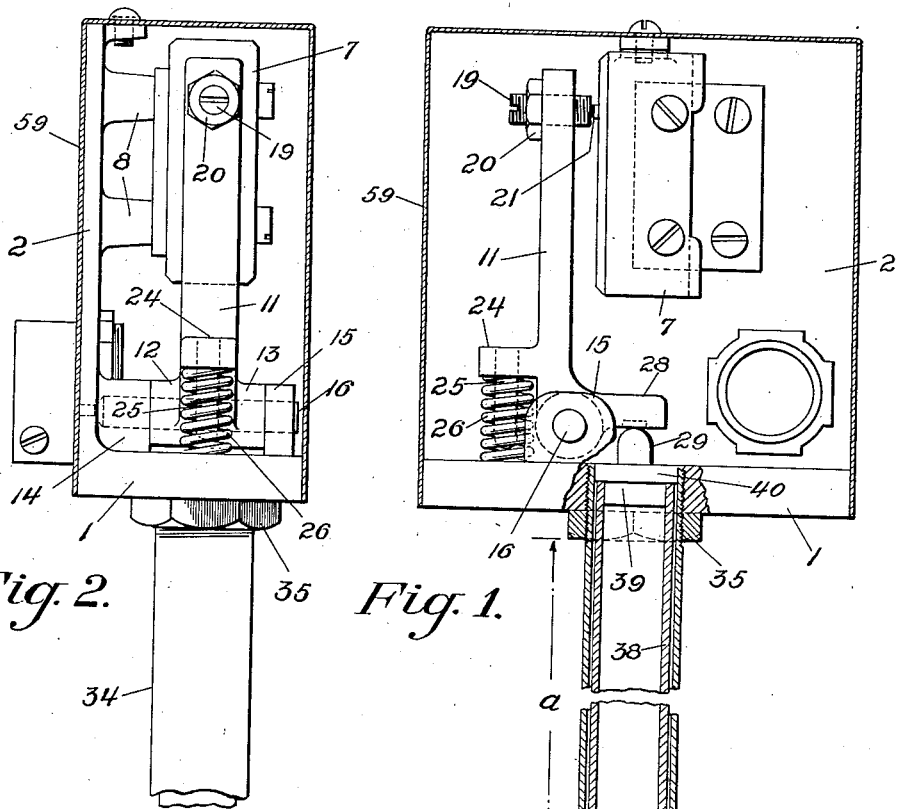
Fig. 1 is a view, partly in elevation and partly in section, of a mechanism embodying certain features of the invention.
Fig. 2 is a fragmentary view looking at Fig. 1 from the left.

Objects of the invention are to provide sturdy, accurate and reliable automatic temperature control means, especially capacitated for use in situations or chambers presenting unusual temperature conditions, as for instance in high temperature furnaces; and capacitated to effect continuous and very accurate temperature control, as for example to control fuel or other heat supply, or to act as limit switches, with a view to insuring the desired quality of products, a very uniform product, and to effect economy of operation; and to furnish mechanisms realizing these advantages at very low cost, and which are accurate, reliable and long-lived at high temperatures, as for example temperature ranges from 800° to 1400° F., and under other temperature fluctuations, such as very low temperatures, as 0° or below; to provide also a mechanism of the kind described wherein the means controlling the heat supply or regulation is effectively protected from excessive high or low temperatures, from wide fluctuations in temperature, mechanical vibration and other disturbing and deteriorative causes. In accordance with certain features of my invention, the active or temperature sensitive element is straight, rigid, of few parts, and frequently of tubular form, having concentric tubes, the outer being integral and the inner having two parts, having different coefficients of expansion, one within the furnace or other insulating wall and the other within the furnace or other chamber itself, the tubes having thin walls with but small space between the inner and outer tubes. Further, in accordance with certain features of the invention, a simple and rugged switch governing mechanism, or other control device, is provided of few parts and having relatively large bearings, preferably mounted on hard metal shafts, said mechanism having a small and slow motion but operating with a positive action, the control for the heat supplying mechanism likewise being effectively protected from damage by high furnace temperatures and from strains or other disturbances due to excessive high or low temperatures and temperature changes. Other features of the invention will be set out in connection with the following detail description of the preferred embodiment, and it will be understood that the foregoing general description and the following detail description are illustrative and exemplary but not restrictive of the invention.

Referring now in detail to the embodiment of the invention illustrated by way of example in the accompanying drawings, (referring especially for the present to Figs. 1 and 2), the control for the heat supply is shown as a switch governing mechanism external to the furnace wall, preferably mounted within a casing which may be heat insulated, and comprising a base or frame including a plate 1 and a plate 2 integral therewith and extending at right-angles therefrom. A suitable switch or circuit controlling mechanism 7 is mounted upon studs 8 fixed to the plate 2, may be of any suitable form, and need not be described in further detail. A circuit controlling lever 11 has apertured bosses 12 and 13 formed near one end thereof, which fit within bearing blocks 14 and 15, formed integral with and extending from the supporting plate 1, a sturdy shaft 16 being mounted in the bearing blocks and extending through the apertured bosses and providing a substantial support on which the lever 11 is pivotally mounted. Near its outer end, the lever 11 carries a screw-threaded actuating stud 19, screw-threaded into a threaded aperture in the lever and provided with a lock-nut 20. The inner end of the stud 19 coacts with a terminal 21, constituting a part of the circuit controlling mechanism 7 to make and break the switch or circuit, and vice versa.

In accordance with one feature of invention, a single spring means is provided for resiliently holding the controlling or governing lever 11 in a definite desired relation to the switch 7 and also maintaining it through suitable connections in definite and accurate relation with the temperature sensitive means later to be described, whereby the switch 7 will respond reliably and accurately to relatively small temperature changes. As embodied, a lug 24 is formed integral with and extends from lever 11, and fixed in and extending from the lug 24 is a pin 25 which extends within a coil spring 26, which is in compression between the lug 24 and the base 1, and acts to resiliently hold the lever 11 with the stud 19 pressing against the contact 21. Extending from the opposite side of the lever 11 and preferably close to its pivotal mounting 16 is an arm 28 which by the action of spring 26 is resiliently held in contact with a member 29 of the temperature sensitive mechanism later to be described. The member 29 operates against a hard metal seat inset into the member 28.

The embodied form of temperature controlled and actuated means comprises an outer tube 34, shown as having its outer end screw-threaded into the base 1 and preferably with a lock nut 35 to hold the parts securely in position. The part $a$ of tube 34 usually is proportioned and designed to lie wholly or in large part outside the furnace, or other temperature controlled instrumentality, and wholly or partly within the furnace wall or other insulating wall, and the part $b$ of that tube is within the temperature-controlled chamber itself. The inner end of tube 34 is preferably closed by a concave spheroidal disk 37 designed to give greater accuracy and responsiveness of movement consequent on temperature changes.

Within the outer part $a$ of tube 34 is a shorter tube 38, of the same material, or otherwise having the same coefficient of expansion, both tubes being of relatively large diameter and thin walls, giving the desired rigidity with small air space between the tubes, thereby conducing to greater sensitivity and quicker changes in temperature variations and rapid transmission of heat through the parts. At its outer end there is closely fitted into tube 38 a plug 39 having a circular flange 40 fitting movably within the tube 34 and abutting on the outer end of tube 38, thus serving as a slidable support and guide for tube 38 within tube 34. The stud 29 is integral with plug 39 and disk 40 and constitutes an accurate and reliable device for moving the switch lever in response to movements of the tube caused by temperature changes.

Within the part $b$ of tube 34, which is the part extending within the furnace, is a member 44, preferably also of tubular form, which preferably has the same characteristics as the tubes previously described, but it has a different coefficient of expansion from tube 34. Within the inner end of tube 44 is a slidable spacing, guiding and connecting device comprising a plug 45 integral with which is a circular flange 46 which abuts on the inner end of tube 44 and has its flat outer surface in contact with the convex face of the disk-like closure 37 of the inner end of tube 34. The connection between the outer end of tube 44 and the inner end of tube 38 comprises a disk 47, fitting slidably within the tube 38, the opposite faces of the disk abutting against the adjacent ends of the inner tubes 38 and 44, there being plugs 48 and 49 integral with disk 47 and fitting within the two tubes, respectively.

In operation, the tube 38, being of the same material as the tube 34, that is, having the same coefficient of expansion, the mechanism is not influenced by temperature conditions within the furnace wall or other insulating wall, but as the tubes 34 and 44 are of different material, having different coefficients of expansion, the lengthening and shortening of the tube 34, with variations in the furnace temperature will move tubes 44 and 38 with their connections longitudinally, and member 29 and spring 26, in cooperation, will move the lever 11 to cause the switch 7 to make and break the circuit in a known manner. The switch 7, or like circuit controlling means may be of any desired form, which may be a snap action or a slow make and break to increase sensitivity. To reduce arcing with the slow make and break, a condenser and resistance are placed in parallel across the gap and operate with a definite make and break. The casing 59 may have a covering 50 of any suitable insulating material and such material is shown in Fig. 3.

In Fig. 3 a different arrangement of the switch mechanism and controls is shown with the corresponding reference numerals applied thereto. In this form a calibrated indicator 54 is shown applied to the stud 19 mounted in the lever 11, the device comprising a disk 54 fixed on the lever arm 11, and a pointer 55 fixed to and turning with the stud 19. The end of lever 11 may be split and have a clamping screw 53. In Fig. 7 a circuit control of the kind previously described is shown diagrammatically. The pin 21 acts upon a spring contact 127 which makes and breaks with the terminal 128. The condenser 56 and the resistance 57 are in parallel across the gap which prevent chattering and other disturbance of the relays.

A form is shown in Figs. 5 and 6 which possess sensitivity and accuracy to an unusual degree, and also may be designed and constructed for different temperature ranges and calibration indications. In this form the pivotal shaft 16 for the lever 11 is mounted in a bracket or cradle 60, which in turn is pivotally carried on a fixed shaft 61 mounted in the frame 1. The spring 26 is in compression between a face 62 of the lever 11 and a seat 63 formed on the cradle 60. A screw-threaded rod 64 is threaded into a like aperture in the base 1, and its inner end abuts on a contact piece 65 set into the outer face of the cradle 60. Fixed to the outer end of the threaded stud 64 is a turning head 69 having a pointer 70, which cooperates with a calibrated dial 71 carried on the outer face of the base 1.

In this construction the pivotal mounting 16 may be moved to and fro with reference to the coacting member 29 of the lower expansion member of the temperature sensitive means by rotating the cradle 60 about its fixed axis 61. By changing the distance between the axes of bearings 16 and 61 the ratio of movement of the switch governing lever 11 with respect to the adjusting screw 64 may be varied to suit different temperature conditions and readings in various installations, as decreasing that distance will increase the ratio of the movement of the bearing 16, which will increase the value of each scale division of the calibrating device, and increasing the distance between the axes will produce the opposite conditions. The same effect may be secured by varying or changing the distance between the axes of shaft 61 and screw 64, and also by changing the pitch of thread on screw 64. This makes it possible to assign any reasonable value to each scale division for any length of tube and for different materials employed in the tubes, as may be found desirable or necessary. In this form, further, only one spring is necessary to keep the cradle 60 pressed against the regulating screw 64, and to keep the switch lever 11 and the temperature sensitive actuating means therefor in accurate predetermined relation.

The invention in its broader aspects is not limited to the specific mechanisms shown and described but departures may be made therefrom within the scope of the accompanying claim without departing from the principles of the invention and without sacrificing its chief advantages.

What I claim is:

A mechanism for governing a switch for controlling temperatures in temperature-governed chambers, including in combination a base plate located externally to the chamber, a heat insulating casing within which the base plate is mounted, a differential-expansion, temperature-operated device mounted on said base plate and extending into the chamber, a switch-controlling lever pivotally mounted on said base plate, said lever being in engagement with and moved by said temperature-operated device, a spring tending to rotate said lever about its pivot to hold it in connection with a movable member of said temperature-operated device, said spring being mounted on the side of the lever pivot opposite to the side of the lever engaged by the temperature-operated device and the spring and said device both being spaced relatively near to the pivot and tending to urge the lever against the pivot in parallel directions, whereby the pivot bearing of the lever will fit accurately and deflection of the lever is avoided.

HERBERT S. BURLING.